(12) United States Patent
Langer et al.

(10) Patent No.: US 8,631,912 B2
(45) Date of Patent: Jan. 21, 2014

(54) BRAKE CALIPER

(75) Inventors: Wolfgang Langer, Frankfurt am Main (DE); Hans Olms, Roβdorf (DE); Thorsten Adam, Mühlheim (DE); Frank Stretz, Rüsselsheim (DE)

(73) Assignee: Continental Teves AG & Co. oHG (DE)

( * ) Notice: Subject to any disclaimer, the term of this patent is extended or adjusted under 35 U.S.C. 154(b) by 509 days.

(21) Appl. No.: 12/299,031

(22) PCT Filed: Apr. 27, 2007

(86) PCT No.: PCT/EP2007/054129
§ 371 (c)(1),
(2), (4) Date: Oct. 30, 2008

(87) PCT Pub. No.: WO2007/125086
PCT Pub. Date: Nov. 8, 2007

(65) Prior Publication Data
US 2009/0127036 A1    May 21, 2009

(30) Foreign Application Priority Data

May 3, 2006   (DE) .......................... 10 2006 020 797
Apr. 13, 2007   (DE) .......................... 10 2007 017 512

(51) Int. Cl.
*F16D 55/18*    (2006.01)

(52) U.S. Cl.
USPC ......................................... 188/72.4; 277/587

(58) Field of Classification Search
USPC .................. 188/72.1, 72.4, 196 R, 71.8, 370; 92/168; 277/586, 587, 641, 642, 643
See application file for complete search history.

(56) References Cited

U.S. PATENT DOCUMENTS

| | | | |
|---|---|---|---|
| 2,216,505 A * | 10/1940 | Warborn Thornhill | 277/466 |
| 3,377,076 A * | 4/1968 | Burnett | 277/582 |
| 3,915,461 A | 10/1975 | Gautier | |
| 5,060,765 A | 10/1991 | Meyer et al. | |
| 5,325,940 A * | 7/1994 | Rueckert et al. | 188/71.8 |
| 5,826,681 A * | 10/1998 | Kubo et al. | 188/71.8 |
| 6,044,936 A * | 4/2000 | Matsumoto et al. | 188/72.4 |

(Continued)

FOREIGN PATENT DOCUMENTS

| | | |
|---|---|---|
| DE | 32 21 208 A1 | 12/1983 |
| DE | 32 47 052 A1 | 6/1984 |

(Continued)

OTHER PUBLICATIONS

English translation of Japanese Office Action mailed Jan. 17, 2012.

*Primary Examiner* — Bradley King
*Assistant Examiner* — Stephen Bowes
(74) *Attorney, Agent, or Firm* — RatnerPrestia

(57) ABSTRACT

A brake caliper for a disk brake is disclosed. The brake caliper includes a caliper housing defining a bore that extends along a bore axis. A piston of an actuating device is mounted within the bore so as to be movable along the bore axis in an application direction and a return direction. A sealing arrangement is at least partially provided between the piston and the bore. The sealing arrangement includes a sealing ring positioned in a radial groove. A base surface of the groove is formed in the direction of the bore axis and oriented antiparallel with respect to the bore axis such that the groove base surface approaches the bore axis in the application direction.

11 Claims, 2 Drawing Sheets

(56) References Cited

U.S. PATENT DOCUMENTS

| | | | |
|---|---|---|---|
| 6,164,422 A * | 12/2000 | Sanitate et al. | 188/72.4 |
| 6,244,393 B1 * | 6/2001 | Weidenweber et al. | 188/72.4 |
| 6,347,689 B1 * | 2/2002 | Ohishi | 188/72.4 |
| 6,439,351 B1 * | 8/2002 | Sanitate et al. | 188/72.4 |
| 7,255,207 B2 * | 8/2007 | Noguchi et al. | 188/72.4 |
| 2003/0024777 A1 | 2/2003 | Kurimoto et al. | |
| 2005/0173215 A1 * | 8/2005 | Watarai et al. | 188/370 |
| 2007/0045062 A1 * | 3/2007 | Watada | 188/72.8 |

FOREIGN PATENT DOCUMENTS

| | | | | |
|---|---|---|---|---|
| DE | 3247052 A1 | 6/1984 | | |
| DE | 3643524 A1 * | 6/1988 | | F16D 65/52 |
| DE | 38 02 014 A1 | 7/1989 | | |
| DE | 89 00 277 U1 | 5/1990 | | |
| DE | 198 60 621 A1 | 7/2000 | | |
| EP | 0 403 635 B1 | 12/1990 | | |
| EP | 1 167 807 A2 | 1/2002 | | |
| EP | 1643152 A2 | 4/2006 | | |
| FR | 1.388.318 | 2/1965 | | |
| JP | 57094139 A * | 6/1982 | | F16D 55/22 |
| JP | 03244836 A * | 10/1991 | | F16D 55/22 |
| JP | 05133429 A * | 5/1993 | | F16D 65/20 |
| JP | 08-233002 | 9/1996 | | |
| JP | 10325432 A | 12/1998 | | |
| JP | 200231174 | 1/2002 | | |
| JP | 2006097816 A | 4/2006 | | |

* cited by examiner

BRAKE CALIPER

CROSS REFERENCE TO RELATED APPLICATIONS

This application is the U.S. national phase application of PCT International Application No. PCT/EP2007/054129, filed Apr. 27, 2007, which claims priority to German Patent Application No. DE102006020797.1, filed May 3, 2006 and German Patent Application No. DE102007017512.6, filed Apr. 13, 2007, the contents of such applications being incorporated by reference herein.

BACKGROUND OF THE INVENTION

1. Field of the Invention

The invention relates to a brake caliper for a disk brake, having a caliper housing in which an actuating device having a piston in a bore is provided. Said piston is mounted so as to be movable in the bore along a bore axis, with a movement being possible in each case in an application direction and in a return direction. A sealing arrangement having a sealing ring in a radial groove is provided between the piston and the bore.

2. Description of the Related Art

A brake caliper of a disk brake is known from EP 0 403 635 B1. Said document specifies a combined brake caliper for a motor vehicle disk brake, which brake caliper comprises a caliper housing in a bore in which a piston for actuating the brake is arranged in a movable fashion. To provide a parking brake function, a shaft is rotatably mounted in the caliper housing, with the shaft extending through the caliper housing and being connected to a ramp element of a ramp arrangement. Between the piston and the bore, a sealing ring is arranged in a groove, which sealing ring is intended to prevent pressure medium for the hydraulic actuation of the disk brake from escaping. It has been found that the present sealing arrangement has considerable disadvantages for comfort and for the wear of linings and friction rings, since only an unsatisfactory return movement of the piston with the brake lining takes place, and an insufficient air play can be generated between the brake lining and the brake disk. As a result of brake linings bearing against the brake disk when the disk brake is not actuated, a braking residual torque is therefore generated which increases fuel consumption and leads to noise being generated and to excessive wear of the brake linings and of the friction rings. The stated disadvantages are particularly severe if the brake is mechanically actuated, since the return movement caused by the sealing ring is reduced.

SUMMARY OF THE INVENTION

It is an object of the invention to specify a brake caliper of a disk brake having an actuating device, which brake caliper avoids the disadvantages of the prior art and in particular effectively ensures that the piston is returned after a brake actuation.

The object is achieved, according to aspects of the invention, in that a groove base of the groove is formed in the direction of the bore axis and so as to be antiparallel with respect to the bore axis in such a way that the groove base approaches the bore axis in the application direction. In the event of a brake actuation in the application direction, the piston pulls the sealing ring with it to a certain extent and therefore moves said sealing ring into the region of the tapering groove. Here, the sealing ring is deformed and builds up a force which acts in the radial direction with respect to the piston and with respect to the groove base. Once the piston is no longer acted on after the brake actuation, the inclination of the groove base in interaction with the sealing ring generates a force component which acts in the return direction and which, in the manner of a downhill-slope force, moves the sealing ring away from the application-side flank of the groove. Here, the sealing ring drives the piston with it, as a result of which said piston is returned and an air play is generated between the brake disk and the brake lining. Said described sealing arrangement is advantageous both for mechanically actuated and also hydraulically actuated pistons and brake calipers since the angle-induced return force improves the ventilation properties. The present concept has however proven to be particularly expedient in a mechanical actuating device. This is because, in the case of a hydraulic actuation, the sealing ring is compressed and deformed by a hydraulic pressure acting on it, as a result of which a deformation-induced return force is generated. Since said phenomenon cannot be utilized in the case of a mechanical actuation, the concept according to aspects of the invention and the return movement which is generated in this way has proven to be particularly effective.

In one refinement of the invention, the groove base is inclined with respect to the bore axis by an angle of 2° to 10° (degrees). The return effect is generated in a particularly advantageous manner with such an inclination of the groove base. In said range, depending on the brake caliper, an expedient inclination can be found at which the sealing ring, in interaction with the other characteristics of the disk brake such as stiffness and expansion of the brake caliper and the compressibility of the brake linings, brings about an advantageous air play. This is because there is a conflict of aims with regard to the magnitude of the air play. If the groove, its groove base and the sealing ring are designed so as to generate a particularly strong return force, and therefore the piston with the brake lining moves away from the brake disk with a large air play, this has the result that, during a subsequent brake actuation, said air play must be overcome before a braking action is obtained. This can lead to an elongation of the braking distance and to uncertainty for the driver, since the brake does not react directly to a braking demand.

In a further specification of the invention, the groove base is inclined with respect to the bore axis by an angle of 3° to 7° (degrees). Furthermore, tests have shown that the effect according to aspects of the invention is particularly advantageous if the angle is substantially 3° or 7° (degrees). The above-specified features apply to hydraulically or mechanically actuated brake calipers, but have a particularly expedient effect in combined brake calipers with mechanical and hydraulic actuation. This is because, in said brake calipers, different return effects are superposed on one another, which effects must be carefully balanced with one another, which was achieved in a surprising manner at an angle of 3° to 7° (degrees), and in particular at 3° and 7° (degrees). The specific design of a respective mechanical, electrical and hydraulic actuating device is not of relevance to the present invention.

It should be noted that the stated positive effects can also be generated if, instead of the complete groove base, only sections of said groove base are inclined. Furthermore, advantageous different inclinations of different sections of the groove base are conceivable. Here, it may also be provided that one section of the groove base is inclined in the application direction in such a way that said groove base approaches the bore axis, and a further section likewise approaches the bore axis in the return direction. This could lead to an expedient central position of the sealing ring and therefore of the air play.

One advantageous refinement of the invention comprises that a flank of the groove is formed at least in sections as a chamfer that encloses an angle of at least 90° (degrees) with a bore surface of the bore. This measure serves to adapt the return effect caused by the inclined groove base to the geometric and functional conditions of the brake caliper.

A chamfer on a return-side flank counteracts an excessive return movement of the piston, that is to say an excessive air play and the associated disadvantages. Such an excessive return movement—so-called knock-back—may be brought about for example by brake disk wobble or by extreme lateral forces on the vehicle wheels. If a knock-back occurs, then the piston drives the sealing ring in the return direction into an excessively returned position, with the sealing ring being elastically deformed into the bevel formed by the chamfer. Since the sealing ring seeks to assume a state of low shape-change energy, a return deformation occurs. The sealing ring moves out of the return-side bevel and thereby drives the piston with it in the application direction, and reduces the excessive air play. The chamfer of the return-side flank preferably encloses an angle of 100° to 120° with the bore surface.

A chamfer on the application-side flank of the groove optimizes the return behaviour of the sealing ring and of the piston. Here, the application-side chamfer encloses an angle of 93° to 97° with the bore surface. It is also possible to not explicitly provide a chamfer on the application-side flank, but instead, to provide a simple bevel, for example 0.2 mm by 45° (degrees), in the transition region between the application-side flank and the bore surface.

The effect which can be obtained by a chamfer on an application-side and/or return-side flank is particularly pronounced if a cut-in depth of the chamfer is at least 30% of the groove cut-in depth. The groove cut-in depth and the cut-in depth of the chamfer are measured perpendicular to the bore axis of the bore.

In a further refinement of the invention—which may be freely combined with the stated features—it is specified that the groove width is 0.5 mm greater than the width of the sealing ring, resulting in an axial groove oversize of greater than 0.5 mm between the sealing ring and groove. Furthermore, the volume of the groove is greater than the volume of the sealing ring, with a volume difference—the so-called free volume—preferably being 10% to 25% of the volume of the groove. These measures allow the sealing ring to move and deform in an optimum fashion in the groove, resulting in optimized air play properties of the brake caliper. The sealing ring and the groove may be geometrically adapted to one another in such a way that the groove cut-in depth is smaller than the radial thickness of the sealing ring. The sealing ring is therefore squashed into the groove, elastically deformed and preloaded in the assembled state.

With regard to the type of brake caliper, various designs are conceivable, wherein the brake caliper may be embodied as a fixed caliper which is fixed to the vehicle, or the caliper housing is mounted in an axially movable manner on a bracket which is fixed to the vehicle, thereby providing a floating caliper design.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
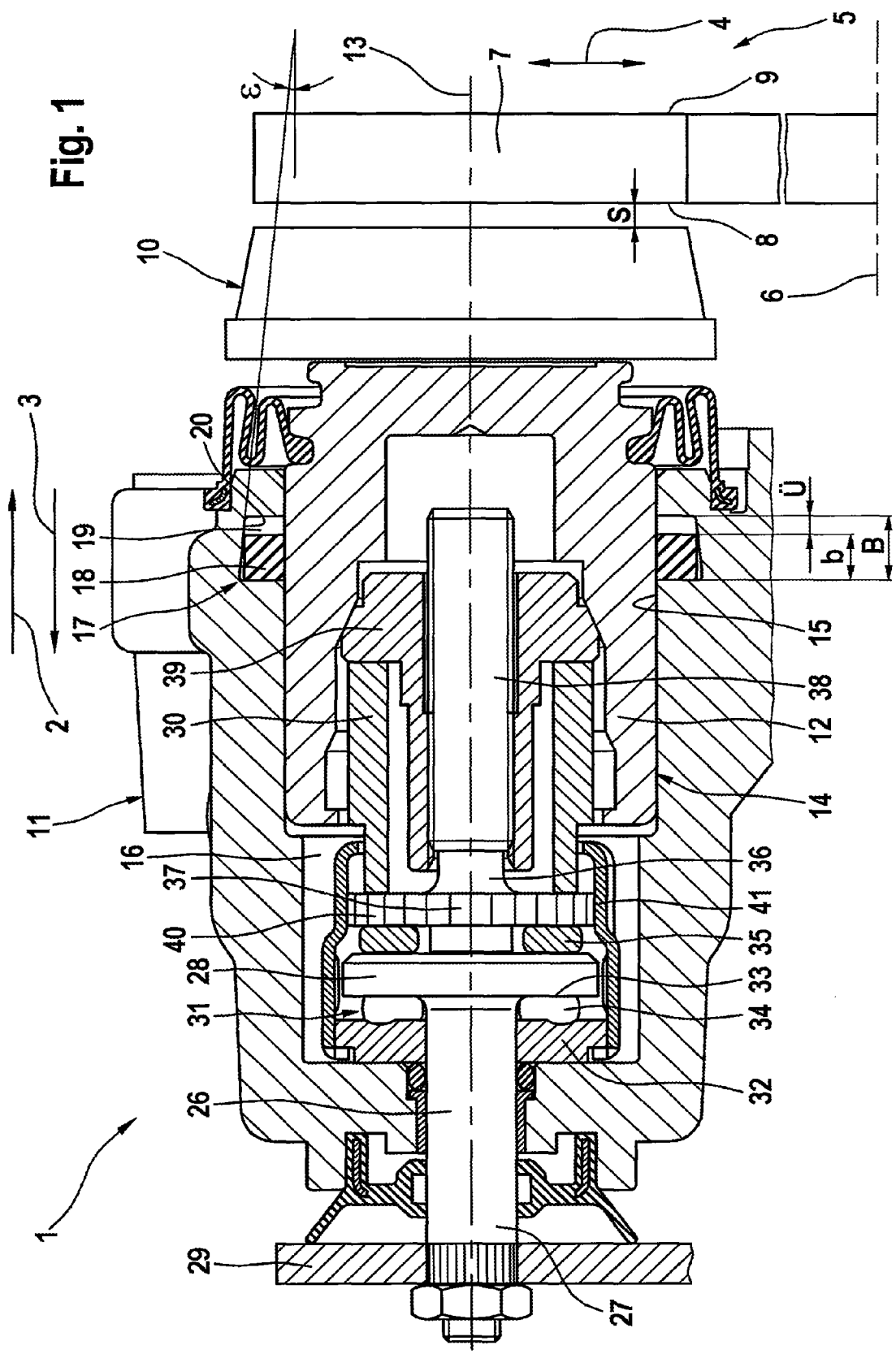
FIG. 1 shows a sectioned view through a brake caliper with a sealing arrangement.

FIG. 1 shows a disk brake having a brake caliper 1, a brake lining 10, and having a brake disk 5, with only those sections of said components which are relevant to the invention being illustrated. The brake caliper 1 comprises inter alia a caliper housing 11 and a piston 12 which, for actuating the brake, is arranged in a bore 14 so as to be movable along a bore axis 13. As a result of the piston 12 being moved in an application direction 2, said piston 12 pushes a brake lining 10 against an axial friction surface 8 of a friction ring 7 of a brake disk 5. Said brake disk 5 is mounted so as to be rotatable about a rotational axis 6. Not illustrated is a housing bridge which extends over the brake disk 5, as a result of which another axial friction surface 9 of the friction ring 7 can also be acted on by means of a further brake lining.

During a service braking operation, the piston 12 is moved by being acted on with hydraulic pressure. For this purpose, the piston 12 forms, with the caliper housing 11, a pressure space 16 in which a pressure medium is provided. Arranged between the bore 14 and the piston 12 is a sealing arrangement 17 which seals off the pressure space 16 with respect to the environment and which serves to adjust an air play S between the brake lining 10 and the friction surface 8. The sealing arrangement 17 comprises a sealing ring 18 which is held by an encircling radial groove 19 in the bore surface 15 of the bore 14. The sealing ring 18 has an axial width b which is preferably approximately 0.5 mm less than the axial groove width B.

Figure 2:
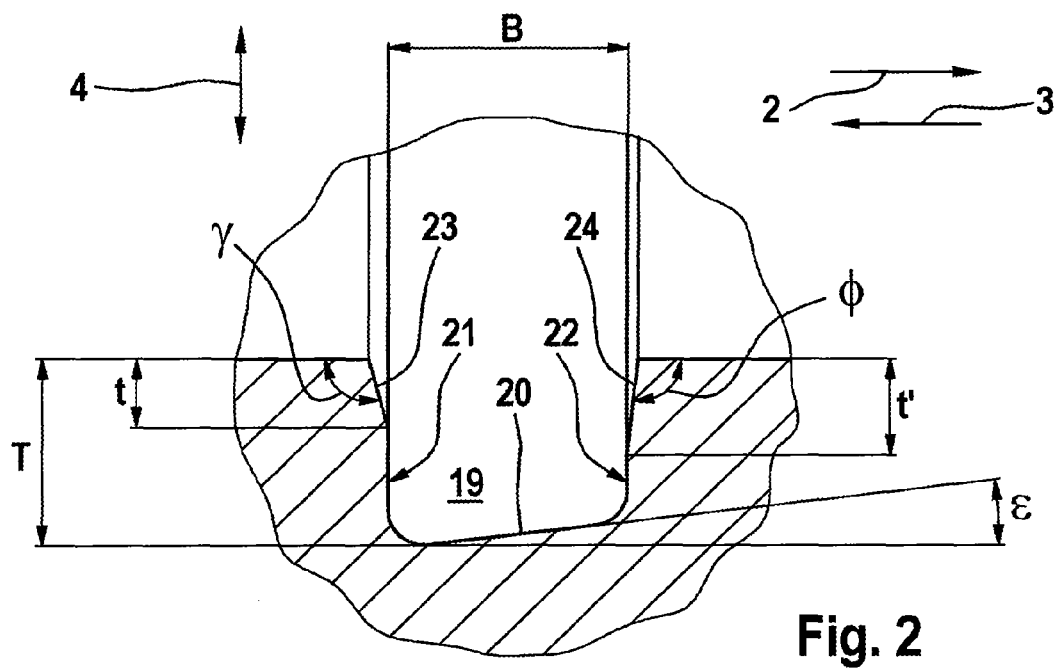
FIG. 2 shows a detailed view of the sealing arrangement according to a first embodiment.
Figure 3:
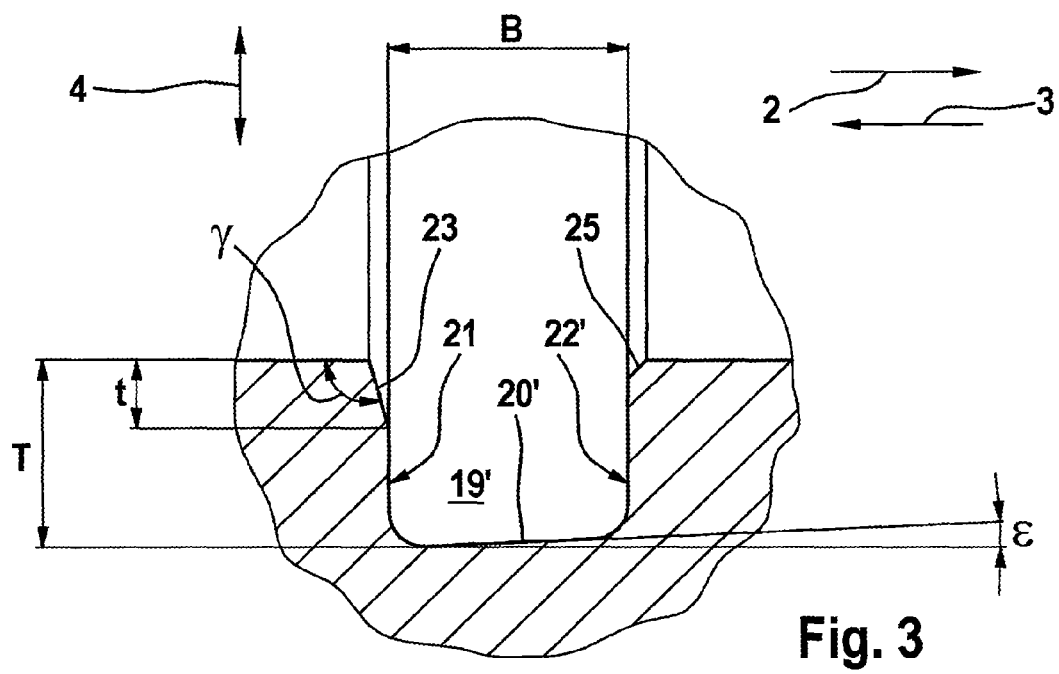
FIG. 3 shows a detailed view of the sealing arrangement according to a second embodiment.

FIG. 2 and FIG. 3 show two embodiments of the groove 19,19' of the sealing arrangement 17, in each case in a detail view. Here, the sealing ring 18 has not been illustrated and separate numbering of identical features has been omitted. The groove 19,19' is formed into the caliper housing 11 with a groove cut-in depth T in a radial direction 4 in relation to the bore 14, and is delimited by the groove base 20,20', the application-side flank 22 and the return-side flank 21. In both embodiments (FIG. 2, FIG. 3) of the groove 19,19', the groove base 20,20' is inclined by the angle $\epsilon$ with respect to the bore axis 13, such that the groove base 20,20' approaches the bore axis 13 in the application direction 2. The angle $\epsilon$ relates here to the axial projection of the groove base 20,20' with respect to the bore axis 13. The angle $\epsilon$ of the first embodiment in FIG. 2 is 7° (degrees), whereas the angle $\epsilon$ in FIG. 3 is 3° (degrees) with respect to the bore axis 13. Consequently, the return effect which is generated by the sealing ring 18 in interaction with the groove base 20,20' is stronger in the first embodiment than in the second embodiment. Furthermore, the two embodiments differ with regard to the application-side flank 22,22'. Provided on the application-side flank 22 of the first embodiment (FIG. 2) is a chamfer 24 which encloses an angle $\phi$ of approximately 95° (degrees) with the bore surface 15. Said chamfer 24 and the bevel which is formed in this way intensifies the return effect of the sealing ring 18 in particular in the event of a hydraulic actuation, since the pressure medium which acts at the return slide elastically deforms the sealing ring 18 into the volume formed by the chamfer 24 and its bevel. A chamfer of said type is dispensed with on the application-side flank 22' in the second embodiment of the groove 19', with a standard bevel 25 of for example 0.2 mm×45° (degrees) being formed at the transition from the flank 22' to the bore surface 15. Both embodiments have in common the fact that a chamfer 23 is likewise provided on the return-side flank 21 of the groove 19,19', which chamfer 23 counteracts an excessive return movement of the piston 12. Said chamfer 23 encloses an angle γ of approximately 16° (degrees) with the bore surface 15. The cut-in depth t of the chamfer 23 measured perpendicular to the bore axis 13 is to be specified as 37% in relation to the groove cut-in depth T in the present exemplary embodiments.

To provide a parking brake function, a mechanical actuating device having a shaft 26 is provided, by means of which the piston 12 can be moved within the bore 14. The shaft 26 extends with a shaft end 27, to which an actuating lever 29 is attached, through an opening of the caliper housing 11. The mechanical actuating device acts on the piston 12 with the interposition of a variable-length adjusting device 30. The mechanical actuating device comprises a ramp arrangement 31 which has a ramp element 32, which is fixed to the housing, and a ramp element 33, which is rotatable with respect thereto. Here, the ramp element 33 is integrally formed on a disk-shaped end section 28 of the shaft 26. A plurality of rolling bodies 34 are arranged between the ramp elements 32,33, such that the ramp arrangement 31 causes an axial movement of the shaft 26 in the application direction 2 in the event of the ramp elements 32,33 rotating relative to one another.

A length-adjustable adjusting device 30 is provided between the end section 28 of the shaft 26 and the piston 12, which adjusting device 30 is shown merely schematically here and transmits the stroke of the ramp arrangement 31 to the piston 12, and automatically compensates wear of the brake lining 10 and of the brake disk 5. Said adjusting device 30 comprises inter alia a spindle 36 having an end section 37 and a nut 39 which is screwed to the shank 38 of the spindle 37 and which bears against the piston 12. An axial bearing 35 is provided between the end side of the spindle 36 and the end section 28.

A plurality of uniform teeth of a toothing 40 are formed on the circumference of an end section 37 of the spindle 36, such that the end section 37 has a star-shaped cross section. In order to prevent the spindle 36 from rotating, a cartridge 41 which is fixed with respect to the housing engages around the end section 37. Since the cartridge 41 at least partially has a star-shaped inner profile which corresponds to the end section 37, it engages into the toothing 40 and, with the end section 37, forms a form-fitting connection in the tangential direction (FIG. 2). The spindle 36 is thereby movable in the actuating direction, but is at the same time held in a rotationally fixed manner within the cartridge 41 and therefore also in the brake caliper 1.

FIG. 1 shows the brake caliper 1 in a non-actuated state. In the event of a hydraulic actuation, the pressure level in the pressure space 16 is increased, which causes the piston 12 to deploy in the application direction 2. The sealing ring 18 is pressed both by the hydraulic pressure and also by the piston movement against the application-side flank 22,22' of the groove 19,19', with the sealing ring 18 being deformed on account of the tapering groove cut-in depth t. After the brake actuation, the sealing ring 18 slides back, on the inclined groove base 20,20', in the return direction 3 by the extent of the oversize Ü, and thereby drives the piston 12 with it. The air play S is set by the returning piston 12.

The functional sequence of the parking brake actuation in the brake caliper 1 from FIG. 1 is explained below. In the event of the parking brake being actuated, the shaft 26 and the end section 28 are rotated by means of the actuating lever 29, and the ramp arrangement 31 is rotated. The two ramp elements 32 and 33 thereby bring about an axial movement of the shaft 26 and of the end section 28. Said axial movement is transmitted by means of the axial bearing 35 to the end section 37 of the spindle 36. Since the spindle 36 is guided in a rotationally fixed manner in the cartridge 41 by means of the toothing 40 of the end section 37, the spindle 36 performs a purely axial movement without rotation. The piston 12 is thus moved with the sealing ring 18 by means of the nut 39 which is screwed onto the shank 38, the brake lining 10 is moved and the brake disk 5 is acted on. After the end of the mechanical actuation, the sealing ring 18 moves in the return direction 3 and pulls the piston 12 with it.

In the present exemplary embodiment, reference has been made to a combined brake caliper in which the mechanical actuating device serves to provide the parking braking action and the hydraulic actuating device serves to provide the service braking action. It is expressly pointed out that this is not intended to have any restrictive effect, since purely hydraulic, mechanical or electrical actuating devices, in each case of diverse design, are likewise conceivable for parking brake or service brake functions.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A brake caliper for a disk brake comprising:
a caliper housing including a bore that extends along a bore axis and a radial groove formed along a surface of the bore;
a piston moveably mounted within the bore along the bore axis in an application direction and a return direction, wherein in the application direction the piston is configured to apply a brake lining against a brake disk and in the return direction the piston is configured to release the brake lining from the brake disk;
a sealing ring positioned in the radial groove and adjacent the piston;
wherein the radial groove includes a flat, revolved and continuous base surface of a given width, wherein the base surface of the radial groove approaches the bore axis in the application direction,
wherein each end of the flat revolved base surface intersects a side surface of the groove at a fillet,
wherein each side surface extends between the base surface and the surface of the bore,
wherein the base surface of the radial groove extends in a given plane across its width,
wherein the given plane and the bore surface are not parallel,
wherein each side surface intersects the surface of the bore at a chamfer of the radial groove,
wherein the chamfer that is on an application-side of the radial groove encloses a first angle (φ) with respect to the bore surface, and
wherein the chamfer that is on a return-side of the radial groove encloses a second angle (γ) with respect to the bore surface that is larger than the first angle (φ),
wherein a gap (Ü) of greater than about 0.5 millimeters is provided between the sealing ring and a surface of the groove.

2. The brake caliper as claimed in claim 1, wherein the sealing ring has a rectangular cross-section.

3. The brake caliper as claimed in claim 1, wherein the groove is formed at least in sections.

4. The brake caliper as claimed in claim 1, wherein a hydraulic actuating device and a mechanical actuating device are provided in the caliper housing.

5. The brake caliper as claimed in claim 1, wherein the groove base surface is inclined with respect to the bore axis by an angle ($\epsilon$) of about 2° to about 10° (degrees).

6. The brake caliper as claimed in claim 5, wherein the groove base surface is inclined with respect to the bore axis by an angle ($\epsilon$) of about 3° to about 7° (degrees).

7. The brake caliper as claimed in claim 1, wherein each angle ($\phi,\epsilon$) is greater than 90° (degrees) with respect to a bore surface of the bore.

8. The brake caliper as claimed in claim 7, wherein a depth (t,t') of the chamfer that is on a return-side of the radial groove is at least about 30% of a depth (T) of the groove.

9. The brake caliper as claimed in claim 7, wherein the angle ($\phi$) on the application-side of the groove is about 93° to about 97° with respect to the bore surface.

10. The brake caliper as claimed in claim 7, wherein the angle ($\gamma$) on the return-side of the groove is about 100° to about 120° with respect to the bore surface.

11. A brake caliper for a disk brake comprising:

a caliper housing including a bore that extends along a bore axis and a radial groove formed along a surface of the bore;

a piston moveably mounted within the bore along the bore axis in an application direction and a return direction, wherein in the application direction the piston is configured to apply a brake lining against a brake disk and in the return direction the piston is configured to release the brake lining from the brake disk;

a sealing ring positioned in the radial groove and adjacent the piston;

wherein the radial groove includes a flat, revolved and continuous base surface of a given width, wherein the base surface of the radial groove approaches the bore axis in the application direction, wherein each end of the flat revolved base surface intersects a side surface of the groove at a fillet, wherein each side surface extends between the base surface and the surface of the bore, wherein the base surface of the radial groove extends in a given plane across its width, wherein the given plane and the bore surface are not parallel, wherein each side surface intersects the surface of the bore at a chamfer of the radial groove, wherein the chamfer that is on an application-side of the radial groove encloses a first angle ($\phi$) with respect to the bore surface, and wherein the chamfer that is on a return-side of the radial groove encloses a second angle ($\gamma$) with respect to the bore surface that is larger than the first angle ($\phi$), wherein an open volume defined by the groove is greater than a volume of the sealing ring.

* * * * *